(12) United States Patent
Yamamura et al.

(10) Patent No.: US 8,618,681 B2
(45) Date of Patent: Dec. 31, 2013

(54) INVERTER GENERATOR CONTROL APPARATUS

(75) Inventors: Yoichi Yamamura, Wako (JP); Shoji Hashimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 55 days.

(21) Appl. No.: 13/472,556

(22) Filed: May 16, 2012

(65) Prior Publication Data

US 2012/0292920 A1 Nov. 22, 2012

(30) Foreign Application Priority Data

May 17, 2011 (JP) .................................. 2011-110567

(51) Int. Cl.
| | |
|---|---|
| *F02D 29/06* | (2006.01) |
| *H02P 9/04* | (2006.01) |
| *F02D 31/00* | (2006.01) |
| *F02D 35/00* | (2006.01) |
| *H02P 23/00* | (2006.01) |
| *H02P 25/00* | (2006.01) |
| *H02P 27/00* | (2006.01) |
| *H02M 5/45* | (2006.01) |

(52) U.S. Cl.
USPC ...... 290/40 B; 290/40 A; 290/40 C; 318/811; 363/37; 363/41

(58) Field of Classification Search
USPC ....... 290/40 A, 40 B, 40 C; 318/811; 363/37, 363/41
See application file for complete search history.

(56) References Cited

U.S. PATENT DOCUMENTS

| | | | | | |
|---|---|---|---|---|---|
| 4,085,438 | A | * | 4/1978 | Butler | 700/278 |
| 4,099,109 | A | * | 7/1978 | Abbondanti | 318/811 |
| 4,227,138 | A | * | 10/1980 | Espelage et al. | 318/802 |
| 4,520,437 | A | * | 5/1985 | Boettcher et al. | 363/41 |
| 4,825,028 | A | * | 4/1989 | Smith | 219/716 |
| 4,937,723 | A | * | 6/1990 | Rozman et al. | 363/51 |
| 4,992,920 | A | * | 2/1991 | Davis | 363/36 |
| 4,994,956 | A | * | 2/1991 | Kirchberg et al. | 363/95 |
| 5,001,622 | A | * | 3/1991 | Kirchberg et al. | 363/95 |
| 5,036,451 | A | * | 7/1991 | Rozman et al. | 363/41 |
| 5,400,237 | A | * | 3/1995 | Flanagan et al. | 363/41 |
| 5,404,089 | A | * | 4/1995 | Flanagan et al. | 318/811 |
| 5,416,689 | A | * | 5/1995 | Silverstein et al. | 363/56.01 |
| 5,428,283 | A | * | 6/1995 | Kalman et al. | 318/729 |
| 5,614,802 | A | * | 3/1997 | Nilssen | 318/800 |

(Continued)

FOREIGN PATENT DOCUMENTS

JP 3464169 11/2003

*Primary Examiner* — Pedro J Cuevas
(74) *Attorney, Agent, or Firm* — Rankin, Hill & Clark LLP

(57) ABSTRACT

In a control apparatus for an inverter generator having a generator unit driven by an engine, a converter connected to the generator unit to convert an alternating current from the generator unit to a direct current, and an inverter connected to the converter to invert the direct current from the converter to an alternating current and output it to an electric load, it is configured to detect an overload condition based on the alternating current from the inverter to the electric load; stop outputting from the inverter to the electric load with the engine being kept operating when the overload condition is detected; output a release command to release a stop condition where the outputting to the electric load is stopped upon manipulation by an operator; and restart the outputting to the electric load by releasing the stop condition when the release command is outputted.

21 Claims, 9 Drawing Sheets

(56) References Cited

U.S. PATENT DOCUMENTS

| | | | |
|---|---|---|---|
| 6,256,212 B1* | 7/2001 | Wobben | 363/40 |
| 6,774,608 B2* | 8/2004 | Hofstetter et al. | 322/24 |
| 7,110,272 B2* | 9/2006 | Nojima | 363/56.03 |
| 7,432,688 B2* | 10/2008 | Liu et al. | 323/224 |
| 7,965,063 B2* | 6/2011 | Hashimoto et al. | 322/37 |
| 8,102,066 B2* | 1/2012 | Hashimoto et al. | 290/40 C |
| 8,120,343 B2* | 2/2012 | Kunimatsu | 323/282 |
| 2005/0286182 A1* | 12/2005 | Jackson | 361/23 |
| 2006/0202559 A1* | 9/2006 | Hashimoto et al. | 307/64 |
| 2009/0302816 A1* | 12/2009 | Kunimatsu | 323/282 |
| 2010/0019507 A1* | 1/2010 | Hashimoto et al. | 290/40 A |
| 2010/0019508 A1* | 1/2010 | Hashimoto et al. | 290/40 B |
| 2010/0019740 A1* | 1/2010 | Hashimoto et al. | 322/58 |
| 2010/0020571 A1* | 1/2010 | Hashimoto et al. | 363/37 |
| 2010/0020572 A1* | 1/2010 | Hashimoto et al. | 363/37 |
| 2012/0291739 A1* | 11/2012 | Hashimoto et al. | 123/179.3 |
| 2012/0292902 A1* | 11/2012 | Yamamura et al. | 290/31 |
| 2012/0293004 A1* | 11/2012 | Hashimoto et al. | 307/82 |
| 2012/0293140 A1* | 11/2012 | Hashimoto | 322/94 |
| 2012/0294049 A1* | 11/2012 | Hashimoto et al. | 363/37 |
| 2012/0294050 A1* | 11/2012 | Hashimoto et al. | 363/37 |

* cited by examiner

INVERTER GENERATOR CONTROL APPARATUS

BACKGROUND OF THE INVENTION

1. Technical Field

Embodiments of the invention relate to an inverter generator control apparatus, particularly to an apparatus for controlling an inverter generator equipped with a generator unit driven by an engine.

2. Background Art

Conventionally, in an apparatus for controlling an inverter generator equipped with a generator unit driven by an engine, there is proposed a technique in which, when an electric load connected to the generator becomes excessive so that an overload condition is detected, the engine operation is stopped to stop outputting to the electric load, thereby protecting the electric load and components (such as an electric circuit, etc.) constituting the generator, as taught, for example, by Japanese Patent No. 3464169 (a paragraph [0075], etc.).

SUMMARY

However, when it is configured as in the reference, in order to restart the outputting to the electric load, the operator (user) needs to restart the stopped engine after eliminating the overload condition by reducing the electric load and it is troublesome for the operator. Further, in the case where a start-up operation of the engine of the generator is carried out manually through a recoil starter or the like, it is a great burden on the operator to conduct the start-up operation every time to restart the outputting.

An object of embodiments of this invention is therefore to overcome the foregoing problems by providing an inverter generator control apparatus that stops outputting to an electric load when the generator is under the overload condition, thereby protecting the electric load, etc., while making it easy to restart the outputting after the stop so as to mitigate a burden on the operator.

In order to achieve the object, the embodiments provide in the first aspect an apparatus for controlling an inverter generator having a generator unit driven by an engine, a converter connected to the generator unit and adapted to convert an alternating current outputted from the generator unit to a direct current, and an inverter connected to the converter and adapted to invert the direct current outputted from the converter to an alternating current and output it to an electric load, comprising: an overload condition detector adapted to detect an overload condition based on the alternating current outputted from the inverter to the electric load; an output stopper adapted to stop outputting from the inverter to the electric load with the engine being kept operating when the overload condition is detected; a release command outputter adapted to output a release command to release a stop condition where the outputting to the electric load is stopped upon manipulation by an operator; and an output restarter adapted to restart the outputting to the electric load by releasing the stop condition when the release command is outputted by the release command outputter.

In order to achieve the object, the embodiments provide in the second aspect a method for controlling an inverter generator having a generator unit driven by an engine, a converter connected to the generator unit and adapted to convert an alternating current outputted from the generator unit to a direct current, and an inverter connected to the converter and adapted to invert the direct current outputted from the converter to an alternating current and output it to an electric load, comprising the steps of: detecting an overload condition based on the alternating current outputted from the inverter to the electric load; stopping outputting from the inverter to the electric load with the engine being kept operating when the overload condition is detected; outputting a release command to release a stop condition where the outputting to the electric load is stopped upon manipulation by an operator; and restarting the outputting to the electric load by releasing the stop condition when the release command is outputted.

BRIEF DESCRIPTION OF DRAWINGS

The above and other objects and advantages will be more apparent from the following description and drawings in which.

DESCRIPTION OF EMBODIMENTS

An inverter generator control apparatus according to embodiments of the present invention will now be explained with reference to the attached drawings.

Figure 1:
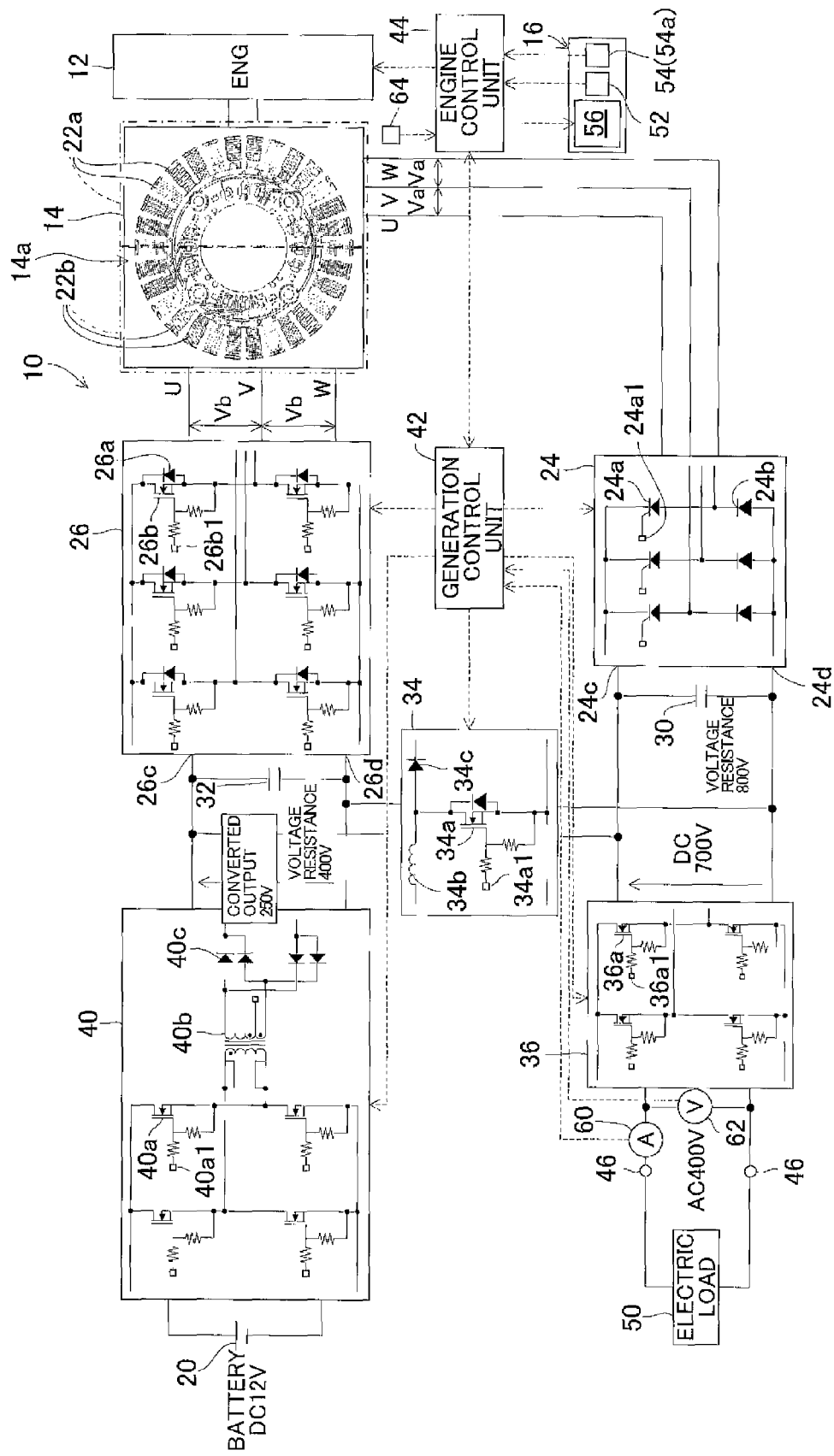
FIG. 1 is an overall block diagram showing an inverter generator control apparatus according to a first embodiment of the invention.

FIG. 1 is an overall block diagram showing an inverter generator control apparatus according to a first embodiment of the invention.

Figure 9:
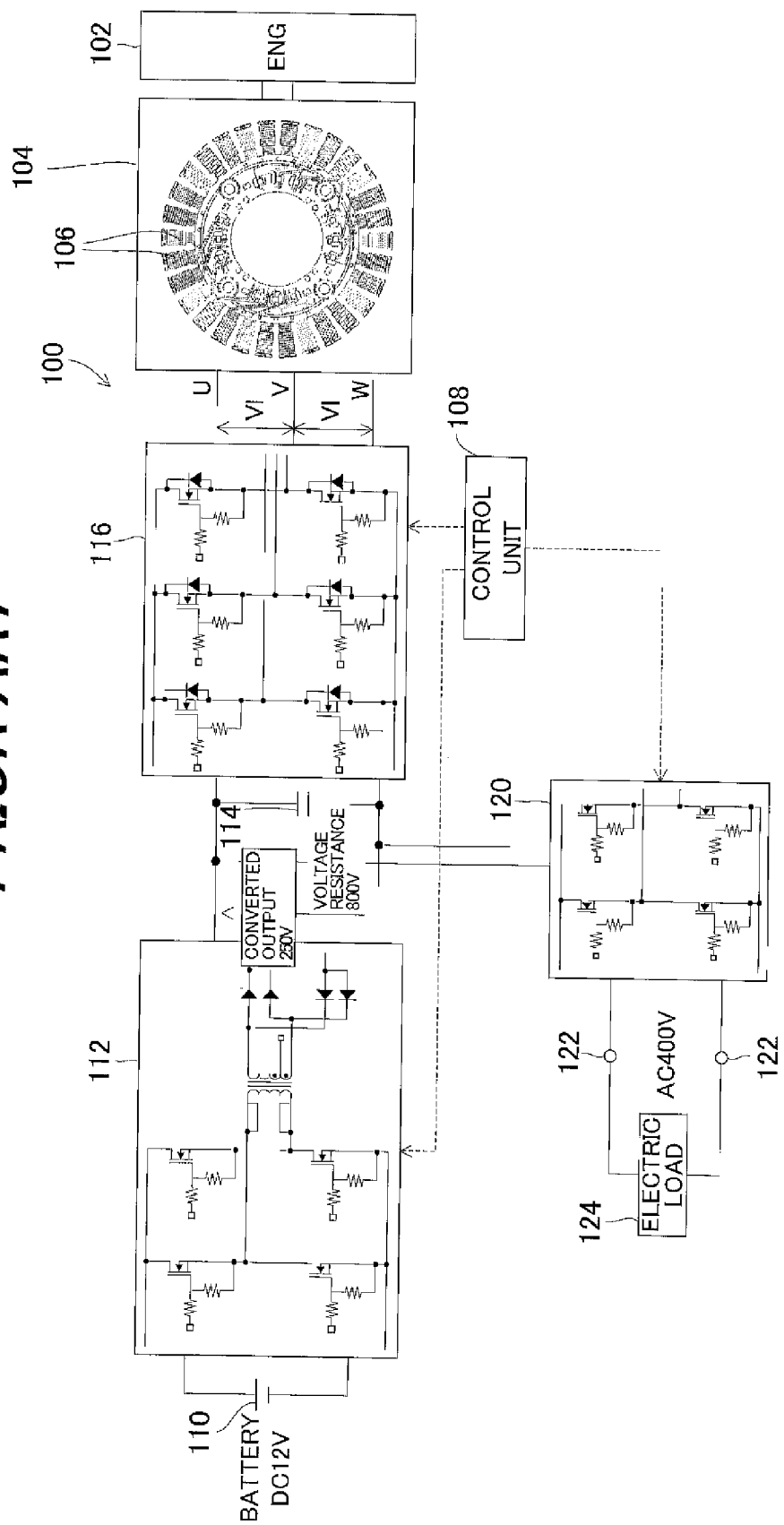
FIG. 9 is an overall block diagram similar to FIG. 1, but showing an inverter generator control apparatus according to a conventional technique.

Before starting the explanation on FIG. 1, the configuration of a conventional inverter generator control apparatus will be explained. FIG. 9 is an overall block diagram similar to FIG. 1, but showing an inverter generator control apparatus according to a conventional technique.

As shown in FIG. 9, an inverter generator 100 is equipped with a generator unit (starter generator) 104 driven by an engine 102 and has a rated output voltage of AC 400V (maximum voltage: 750V). The generator unit 104 is wound by an output winding 106 and a line-to-line voltage V1 to be generated at the output winding 106 (i.e., an output voltage of the generator unit 104) is 500V that is defined by the rated output voltage of the inverter generator 100. The line-to-line voltage defined in accordance with the rated output voltage of the generator is hereinafter called the "defined line-to-line voltage."

The engine 102 is started upon rotating operation of the generator unit 104. To be more specific, a control unit 108 having a CPU, etc., boosts a DC voltage (12V) outputted from a battery 110 to 500V through a DC/DC converter 112 and inputs the boosted output through a smoothing capacitor 114 to a converter 116 that functions as a starter driver. The control unit 108 supplies the output winding 106 wound around the generator unit 104 with the battery output inputted to the converter 116 so as to rotate a rotor (not shown) of the generator unit 104, which rotor doubles as or shares a flywheel of the engine 102, thereby starting the engine 102.

When the engine 102 is started and the generator unit 104 starts generating power, the control unit 108 converts an alternating current outputted from the output winding 106 of the generator unit 104 (at this time, the line-to-line voltage V1 is 500V) into a direct current through the converter 116. After smoothing it through the smoothing capacitor 114, the control unit 108 inputs it to an inverter 120 where the direct current is inverted to the alternating current of 400V having a predetermined frequency (more exactly, 50 Hz or 60 Hz), and then supplies it to an electric load 124 through output terminals 122. Since the smoothing capacitor 114 is applied with a relatively high voltage, a voltage-endurance value thereof is set comparatively high (e.g., 800V).

Based on the configuration of the conventional inverter generator 100, the explanation on FIG. 1 will be made. In FIG. 1, symbol 10 designates an inverter generator. The generator 10 is equipped with an engine (internal combustion engine) 12, a generator unit (starter generator) 14 driven by the engine 12, and a control panel 16 adapted to output operation commands of the generator 10 upon manipulation by the operator (user) and display operating conditions of the generator 10, etc. The generator 10 has a relatively high rated output, i.e., a rated output voltage of AC 400V.

The engine 12 is an air-cooled, spark-ignition gasoline engine with a displacement of 390 cc, for instance. The engine 12 is connected to a battery 20 that outputs a DC voltage of rated 12V and is used as a power source for operating a throttle motor, ignition plug (neither shown), etc.

Figure 2:
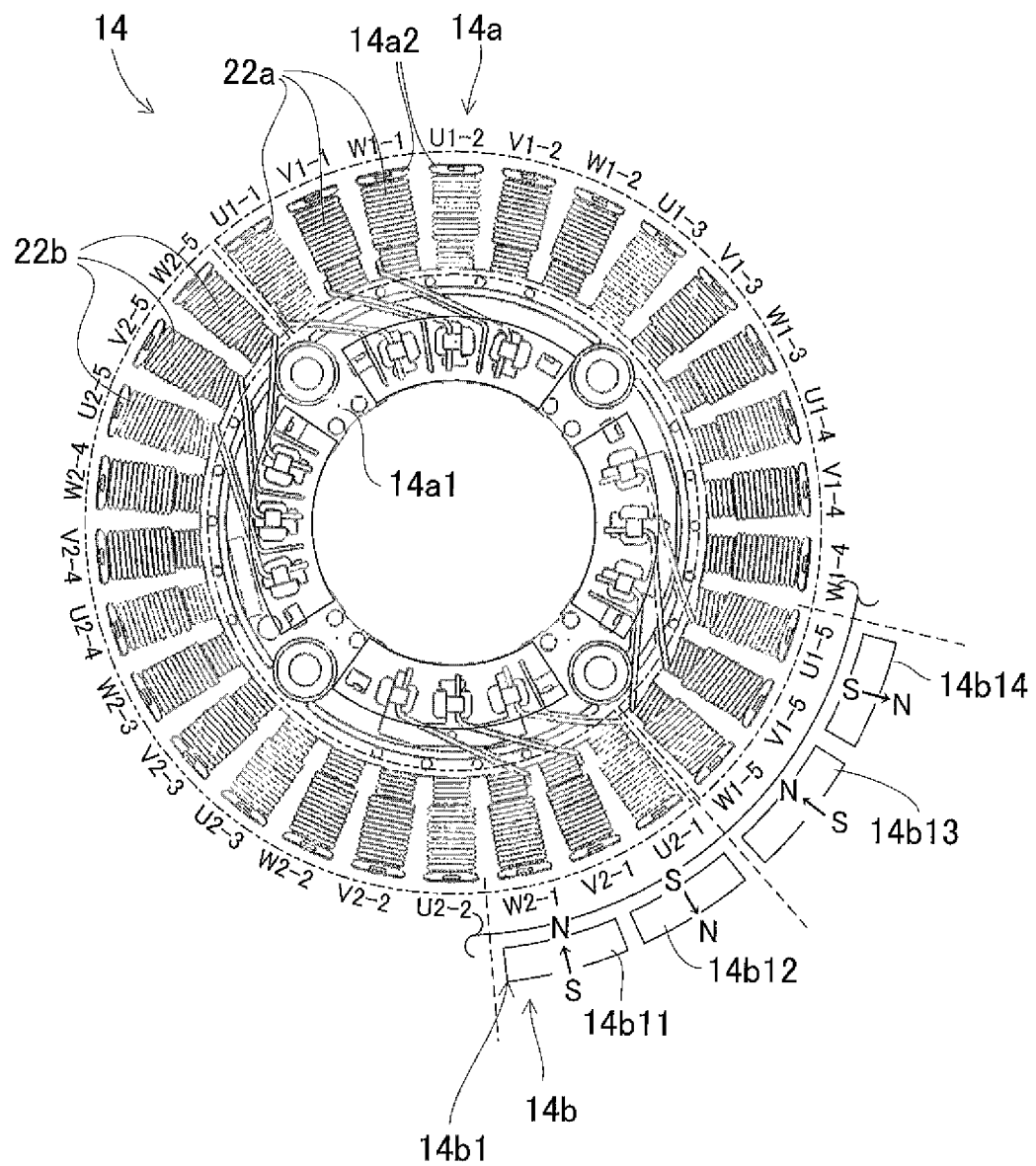
FIG. 2 is a plan view showing a stator and the like constituting a generator unit shown in FIG. 1.

FIG. 2 is a plan view showing a stator and the like constituting the generator unit 14.

The generator unit 14 includes a stator 14a fixed at a crankcase (not shown) of the engine 12 and a rotor 14b which is rotatably installed around the stator 14a and functions also as a flywheel of the engine 12.

The stator 14a has a stator core 14a1 that is formed with a plurality of, i.e., thirty projections (teeth) 14a2 arranged radially. As illustrated, out of the thirty projections 14a2, a half, i.e., fifteen projections 14a2 are wound by first three-phase output winding (hereinafter called the "first winding"; surrounded by a dotted and dashed line in FIG. 1) 22a of U, V, and W-phase, while the remaining fifteen projections 14a2 are similarly wound by second three-phase output winding (hereinafter called the "second winding"; surrounded by a two dotted and dashed line in FIG. 1) 22b of U, V, and W-phase.

The first winding 22a is designed so that a line-to-line voltage (defined line-to-line voltage) Va defined by the rated output voltage of the generator 10 is generated at power generation and, to be specific, is set to 500V (maximum voltage: 750V) that is the same as the voltage generated at the conventional output winding 106. A line-to-line voltage Vb generated at the second winding 22b is set lower than that of the first winding 22a, more exactly, set to a value of about 50% (more precisely, just 50%) of the voltage Va of the first winding 22a. In other words, the line-to-line voltage Vb of the second winding 22b is 250V (maximum voltage: 375V) that corresponds to about 50% of the voltage of the conventional output winding 106.

The line-to-line voltage Vb generated at the second winding 22b can be decreased by, for instance, decreasing the number of turns of the second winding 22b to be smaller than that of the first winding 22a. Thus, the winding of the generator unit 14 is divided into two systems of the first and second windings 22a, 22b having different line-to-line voltages.

The inside of the rotor 14b is attached with ten pairs of, i.e., twenty permanent magnet pieces 14b1 to face the first and second windings 22a, 22b with their radially oriented polarities reversed alternately as illustrated (partially shown in FIG. 2). The permanent magnet pieces 14b1 are arranged so that every pair thereof (e.g., 14b11 and 14b12) corresponds to every three projections 14a2.

When the permanent magnet pieces 14b1 of the rotor 14b are rotated around the stator 14a, a three-phase (U, V and W-phase) alternating current is outputted from (generated at) each of the first and second windings 22a, 22b.

Returning to the explanation on FIG. 1, the generator 10 is further equipped with a first converter (rectifier) 24 connected to the first winding 22a, a second converter (rectifier) 26 connected to the second winding 22b, first and second smoothing capacitors 30, 32 respectively connected to the first and second converters 24, 26, a boost converter 34 connected at a stage downstream of the second smoothing capacitor 32, an inverter 36 connected at a stage downstream of the first converter 24 and boost converter 34, a DC/DC converter 40 connected to the battery 20, a generation control unit 42 adapted to control operations of the first converter 24, inverter 36, etc., and an engine control unit 44 adapted to control the operation of the engine 12, etc. Note that, in the embodiments, a term of "downstream" means it in a current flow from the generator unit 14 during power generation.

The first converter 24 has bridge-connected three pairs of thyristors 24a and diodes 24b and gate terminals 24a1 of the thyristors 24a are connected to the battery 20 through the generation control unit 42. In accordance with a turn-on angle of the thyristor 24a controlled by the generation control unit 42, the first converter 24 converts the alternating current outputted from the first winding 22a to the direct current and outputs it from positive and negative output terminals 24c, 24d.

The first smoothing capacitor 30 is connected at a stage downstream of the first converter 24 to smooth the direct current outputted from the first converter 24. The voltage-endurance value of the first smoothing capacitor 30 is set relatively high, more exactly, for instance, to 800V that is the same as that of the conventional smoothing capacitor 114.

The second converter 26 has a circuit containing bridge-connected six Field Effect Transistors (FETs; switching elements) 26b including body diodes 26a, and gate terminals 26b1 of the FETs 26b are connected to the battery 20. In response to the operations (i.e., turning-on and turning-off (conducted and not-conducted modes)) of the FETs 26b controlled by the generation control unit 42, with the use of the body diodes 26a, the second converter 26 converts the alternating current outputted from the second winding 22b to the direct current and outputs it from positive and negative output terminals 26c, 26d.

The second converter 26 also functions as a starter driver (starter/generator driver) that operates the second winding 22b so as to work as a starter of the engine 12 in addition to its function as a generator. Specifically, in this embodiment, the second winding 22b is supplied with a current to rotate the generator unit 14 to start the engine 12, i.e., the generator unit 14 functions as the generator (starter motor).

To be more specific, upon the operations of the FETs 26*b* controlled by the generation control unit 42, the second converter (starter driver) 26 supplies the output of the battery 20 to the second winding 22*b* to rotate the generator unit 14 to start the engine 12. Note that, at the engine start, the battery output is inputted from the output terminals 26*c*, 26*d*, in other words, the output terminals 26*c*, 26*d* function as input terminals.

The second smoothing capacitor 32 is connected at a stage downstream of the second converter 26 to smooth the direct current outputted from the second converter 26. Since the second smoothing capacitor 32 is inputted with the output of the second winding 22*b* whose line-to-line voltage Vb is set relatively low, the voltage-endurance value of lower than that of the first smoothing capacitor 30 suffices for the second smoothing capacitor 32. For example, the voltage-endurance value of the second smoothing capacitor 32 is set to 400V that corresponds to about 50% of that of the first smoothing capacitor 30, i.e., of the conventional smoothing capacitor 114 shown in FIG. 9.

The boost converter 34 is parallel-connected at its input side with the positive and negative output terminals 26*c*, 26*d* of the second converter and at its output side between the positive and negative output terminals 24*c*, 24*d* of the first converter 24. As is clear from FIG. 1, connection points of the boost converter 34 on the input and output sides are positioned downstream of the first and second smoothing capacitors 30, 32.

The boost converter 34 includes a chopper type DC/DC converter having an FET 34*a*, choke coil 34*b* and diode 34*c*, and a gate 34*a*1 of the FET 34*a* is connected to the battery 20. In response to the operation of the FET 34*a* controlled by the generation control unit 42, the boost converter 34 boosts the voltage of the direct current outputted from the second converter 26 and outputs it.

The inverter 36 is connected at its input side with the first converter 24 and boost converter 34. The inverter 36 has a circuit including bridge-connected four FETs 36*a*, and gates 36*a*1 of the FETs 36*a* are connected to the battery 20. In response to turning-on and turning-off of the FETs 36*a* controlled by the generation control unit 42, the inverter 36 inverts the direct currents outputted from the first converter 24 and boost converter 34 to single-phase alternating currents of the predetermined frequency (50 Hz or 60 Hz commercial frequency).

The inverter 36 outputs the alternating currents from output terminals 46 through filters (not shown) that remove harmonic components of the alternating current, and supplies them to an electric load 50 through a connector (not shown), etc.

The DC/DC converter 40 is connected at its input side with the battery 20 and at its output side with the positive and negative output terminals 26*c*, 26*d* (functioning as the input terminals here, as mentioned above) of the second converter 26.

The DC/DC converter 40 comprises an insulating type DC/DC converter having bridge-connected four FETs 40*a*, a transformer 40*b* and diodes 40*c*, and gates 40*a*1 of the FETs 40*a* are connected to the battery 20. In response to the operations of the FETs 40*a* controlled by the generation control unit 42, the DC/DC converter 40 boosts the DC voltage outputted from the battery 20 and outputs it at the engine start, while, after the engine start, it steps down the voltage of the direct current generated at the second winding 22*b* of the generator unit 14 and outputted from the second converter 26 and supplies it to the battery 20 to charge it.

The generation control unit 42 has a CPU and the like and controls the operations of the first converter 24, second converter (starter driver) 26, inverter 36, etc., as mentioned above. The engine control unit 44 also has a CPU, etc., and controls the operation of the engine 12, operation of generating power, and other operations.

The generation control unit 42 and engine control unit 44 are interconnected to be communicatable with each other through, for instance, a CAN (Controller Area Network). The control units 42, 44 are connected to the battery 20 and supplied with operating power therefrom. Although not illustrated, a transformer and rectifier circuit are connected to an output stage of one phase from among the U, V and W-phases outputted from the first winding 22*a*, and power stepped down and rectified therethrough is also supplied to each of the control units 42, 44, etc. Specifically, the battery output and part of power generated at the first winding 22*a* are used as control power, i.e., used for controlling the operations.

The control panel 16 is installed to be manipulatable by the operator to be visible. It should be noted that the control panel 16 may be a portable device separate from the main body of the generator 10 and, in this case, it is connected to the generator main body (more precisely, the engine control unit 44) by wireless (or by wire) to be communicatable therewith to remotely manipulate the generator 10.

FIGS. 3A-3D are plan views showing the control panel 16.

Figure 3A:
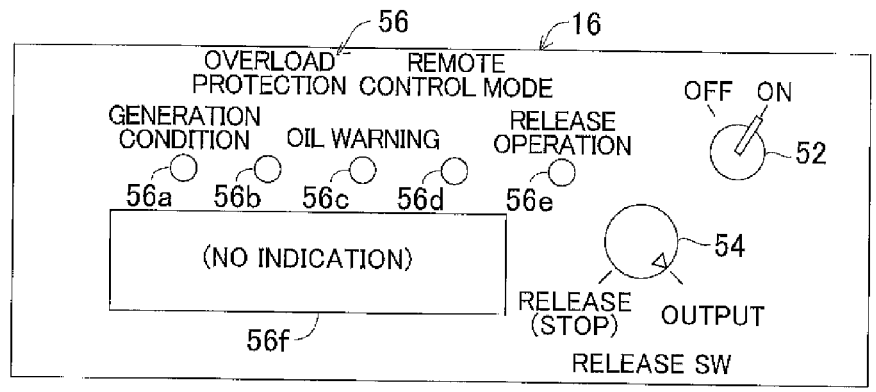
FIGS. 3A-3D are plan views showing a control panel shown in FIG. 1.

As shown in FIG. 3A, the control panel 16 is equipped with a start and stop switch 52 that outputs a start command (ON) and a stop command (OFF) upon manipulation by the operator, with a release switch (start and stop control switch; release command outputter) 54 that, after an overload condition is detected (described later) and outputting (power supply) to an electric load 50 is stopped accordingly, outputs a release command to release a stop condition where the outputting to the electric load 50 is stopped or not in process, and other commands, upon manipulation by the operator, and with a display unit 56 that displays an operating condition of the generator 10, etc.

Specifically, the start and stop switch 52 is operated to switch between (or select one of) two positions of a start position (indicated by "ON" in FIGS. 3A-3D) and a stop position (indicated by "OFF") and outputs a signal indicative of a selected position.

The release switch 54 is constituted of or includes a volume switch that is installed to be manually operated by the operator to switch between (or select one of) two positions of an output position at which the outputting to the electric load 50 is enabled and a release position at which, after the outputting is stopped due to the overload condition, this stop condition is released, and outputs a signal indicative of a selected position.

The release switch 54 produces a click feel when it is turned to and from the output position. The release switch 54 is positioned to designate the output position in the normal operation, as shown in FIG. 3A. The outputs of the switches 52, 54 are sent to the engine control unit 44.

The display unit 56 includes a generation condition lamp 56*a* indicating a power generation condition, an overload protection lamp 56*b* indicating that the electric circuit is protected by stopping the outputting to the electric load 50 in response to detection of the overload condition, an oil warning lamp 56*c* indicating a low oil level of the engine 12, a remote control mode lamp 56*d* indicating that it is in a remote control mode, a release operation indicating lamp 56*e* indicating that the release switch 54 is manipulated so that the release command is outputted, and an LCD 56*f* displaying the operating condition, etc., of the generator 10.

The above lamps 56a to 56b are constituted of LEDs and the operations (turning-on (blinking)/turning-off) thereof are controlled by the engine control unit 44. The operation of the LCD 56f is also controlled by the engine control unit 44.

Returning to the explanation on FIG. 1, a current sensor (over load condition detector) 60 and voltage sensor 62 are installed at electric wires between the inverter 36 and the output terminals 46 and produce outputs or signals indicative of a current and voltage, respectively, of the alternating current outputted from the inverter 36 to the electric load 50 through the output terminals 46. The outputs of the sensors 60, 62 are sent to the generation control unit 42.

A crank angle sensor 64 comprising an electromagnetic pickup is installed near the flywheel, i.e., the rotor 14b of the engine 12 to produce a pulse signal at every predetermined crank angular position and output it to the engine control unit 44.

Starting (activating) operation and stopping operation of the foregoing generator 10 will be explained with reference to FIG. 1.

When the start and stop switch 52 is turned on by the operator, the engine control unit 44 outputs a start signal of the engine 12 to the generation control unit 42. Upon receipt of the start signal, the generation control unit 42 supplies the output of the battery 20 to (i.e., energizes) the second winding 22b to rotate the generator unit 14 to start the engine 12.

Specifically, the output DC voltage (12V) of the battery 20 is boosted to 250V or thereabout by the DC/DC converter 40 and sent to the second converter (starter driver) 26. The second converter 26 serving as the starter driver supplies the boosted battery output to the second winding 22b, whereby the rotor 14b of the generator unit 14 is rotated relative to the stator 14a to start the engine 12.

Here, the boosting operation of the DC/DC converter 40 is explained in detail. In the case where the line-to-line voltage Vb of the second winding 22b is set to 500V (defined line-to-line voltage) that is the same as the line-to-line voltage of the conventional output winding 106 (which is explained above with FIG. 9), the voltage that enables the rotating operation of the generator unit 14 (i.e., the voltage enough to acquire sufficient torque for making the generator unit 14 work as the starter motor) is to be about 500V. In this case, as explained in relation to the conventional DC/DC converter 112 (corresponding to the converter 40 in the embodiments), it is necessary to boost the battery voltage (12V) to 500V, so that the boost ratio rises and the converter size is increased accordingly.

However, in the embodiments, the line-to-line voltage Vb of the second winding 22b is set to 250V that corresponds to about 50% of the line-to-line voltage of the conventional output winding 106, i.e., of the first winding 22a. Consequently, the necessary voltage that enables the rotating operation of the generator unit 14 can be about 250V, so that it suffices if the DC/DC converter 40 boosts the battery voltage to 250V. As a result, the boost ratio of the DC/DC converter 40 can be suppressed and the converter size can be made compact accordingly.

The engine control unit 44 counts or measures a time period between the output pulses of the crank angle sensor 64 to detect (calculate) an engine speed NE and, once the detected engine speed NE reaches a self-rotating speed, outputs a generation start signal, which makes power generation start, to the generation control unit 42. In response to receipt of the generation start signal, the generation control unit 42 controls the operations of the first converter 24, inverter 36 and the like to supply power generated at the generator unit 14 to the electric load 50.

Specifically, three-phase AC power (500V) outputted from (generated at) the first winding 22a of the generator unit 14 is inputted to the first converter 24 and the first converter 24 converts the inputted alternating current to a direct current (700V) and outputs it. The direct current outputted from the first converter 24 is smoothed through the first smoothing capacitor 30 and inputted to the inverter 36.

On the other hand, three-phase AC power (250V) outputted from (generated at) the second winding 22b of the generator unit 14 is inputted to the second converter 26 and the second converter 26 converts it to a direct current (350V) using the body diodes 26a and outputs it. The direct current outputted from the second converter 26 is smoothed through the second smoothing capacitor 32 and inputted to the boost converter 34. The boost converter 134 boosts the DC voltage from the second converter 26 to a double, i.e., 700V and outputs it to the inverter 36. Consequently, the inverter 36 is inputted with a superimposed current that is a sum of the direct current from the first converter 24 and the direct current from the boost converter 34.

The inverter 36 inverts the inputted direct current to a single-phase alternating current (AC 400V) of the predetermined frequency and supplies it from the output terminals 46 through the filters to the electric load 50. The engine control unit 44 turns on the generation condition lamp 56a to inform the operator that power generation has been started.

When the start and stop switch 16a is turned off by the operator, the engine control unit 44 stops the engine 12 through ignition-cut or the like and outputs a generation stop signal, which makes power generation stop, to the generation control unit 42. In response to receipt of the generation stop signal, the generation control unit 42 controls the operations of the inverter 36 and the like to stop power supply to the electric load 50 (i.e., stop power generation). Simultaneously, the engine control unit 44 turns off the generation condition lamp 56a.

Next, the operation of the generator 10 when power generated at the generator unit 14 is supplied to the electric load 50 and the electric load 50 becomes excessive, i.e., the overload condition occurs, will be explained.

Figure 4:
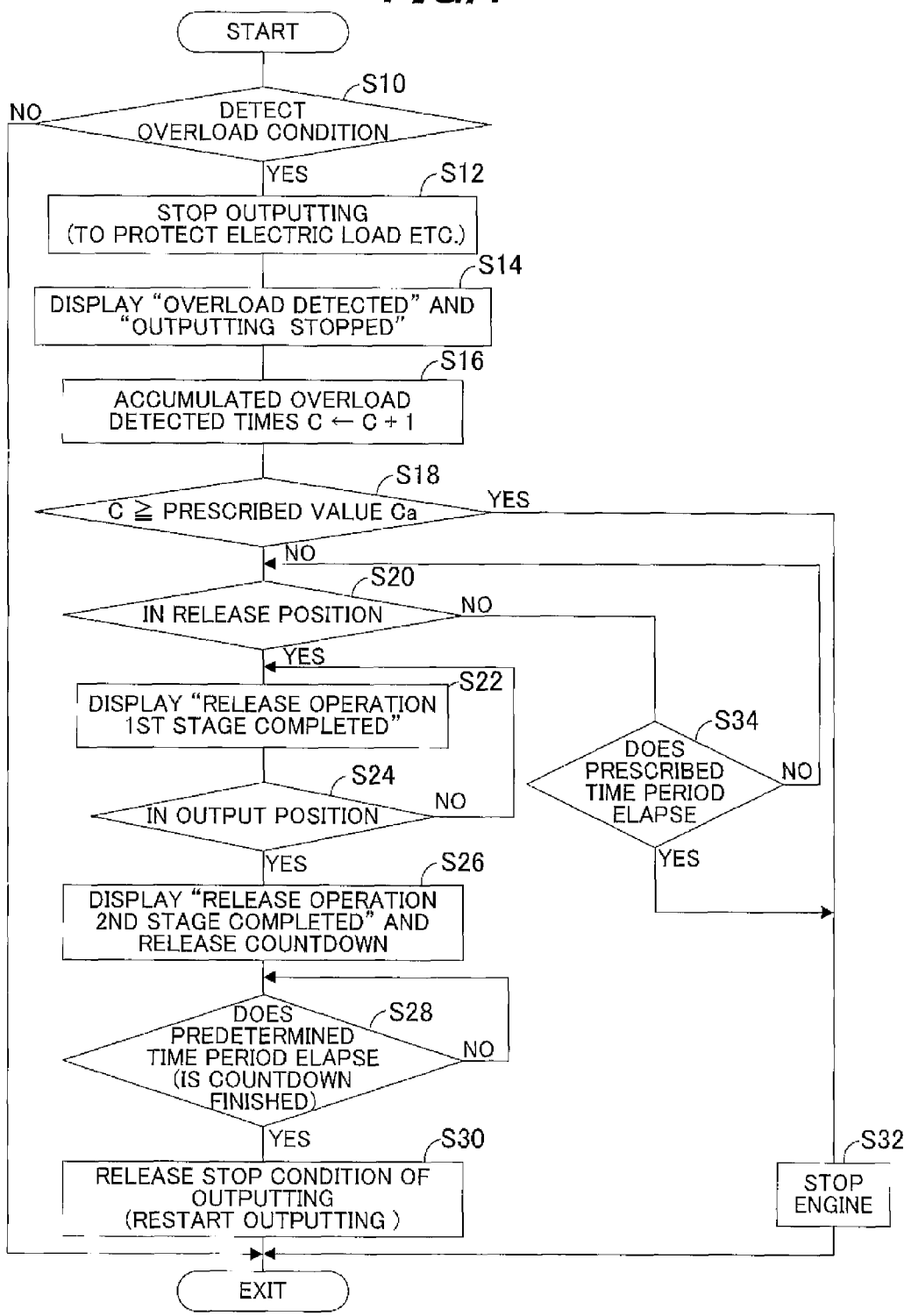
FIG. 4 is a flowchart showing the operation of an engine control unit shown in FIG. 1.

FIG. 4 is a flowchart showing the operation of the engine control unit 44 when the overload condition is detected. The illustrated program is executed by the engine control unit 44 at predetermined intervals, e.g., 10 milliseconds.

As shown in FIG. 4, the program begins at S (Step; Processing step) 10 in which it is determined whether the overload condition is detected by the generation control unit 42. Specifically, when a current detected by the current sensor 62 (i.e., an alternating current outputted from the inverter 36 to the electric load 50) exceeds a permissible value defined in accordance with the rated output, the generation control unit 42 determines that the overload condition occurs and outputs an overload signal, which indicates that the overload condition is detected, to the engine control unit 44. Thus, in S10, upon receipt of the overload signal, it is discriminated that the overload condition is detected.

When the result in S10 is negative, the remaining steps are skipped, while when the result is affirmative, the program proceeds to S12 in which the outputting to the electric load 50 is stopped and an output stop signal is sent to the generation control unit 42 to protect the electric circuit (including the first converter 24, inverter 36, etc.) and the electric load 50. Upon receipt of the output stop signal, the generation control unit 42 controls the operation of the inverter 36 for example, thereby stopping the outputting from the inverter 36 to the electric load 50. At this time, the operation of the engine 12 is not stopped, i.e., is continued.

Figure 3B:
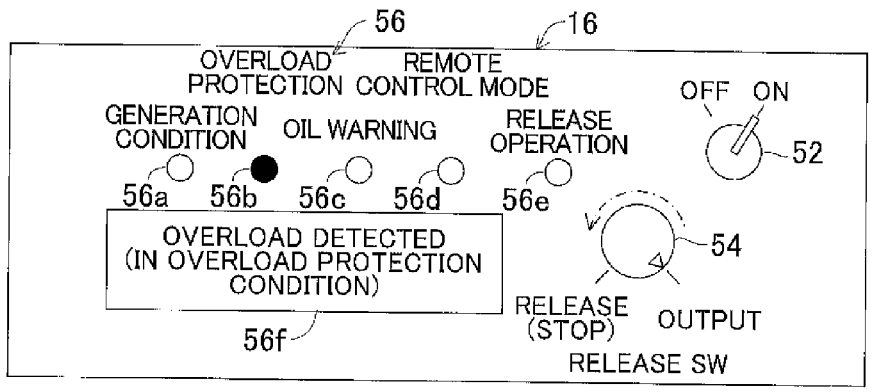

The program proceeds to S14 in which facts that the overload condition has been detected and the outputting to the electric load 50 has been stopped to protect the electric circuit are informed to the operator through the display unit 56. Specifically, as shown in FIG. 3B, the overload protection lamp 56b of the display unit 56 is operated (turned on) while an indication saying "overload detected," "in overload protection condition," "outputting stopped" or the like is displayed in the LCD 56f.

Next the program proceeds to S16 in which a counter value C is incremented by one. In other words, the value C of a counter that counts the number of times the overload condition is detected in S10 (accumulated overload detected times) is incremented by 1.

Next the program proceeds to S18 in which it is determined whether the counter value C reaches a prescribed value Ca (described later) set to two or more. Since the initial value of the value C is 0, the result in S18 is generally negative when it is first processed, and the program proceeds to S20.

In S20, it is determined whether, from among a plurality of (two stages of) operations (release operation) to release the stop condition where the outputting to the electric load 50 is stopped, a first stage operation is conducted. Specifically, it is determined whether the release position of the release switch 54 is selected upon manipulation by the operator. To be more specific, it is determined whether the release switch 54 is turned to the release position located leftward in FIGS. 3A-3D, as indicated by an arrow of dashed and dotted line in FIG. 3B.

Figure 3C:
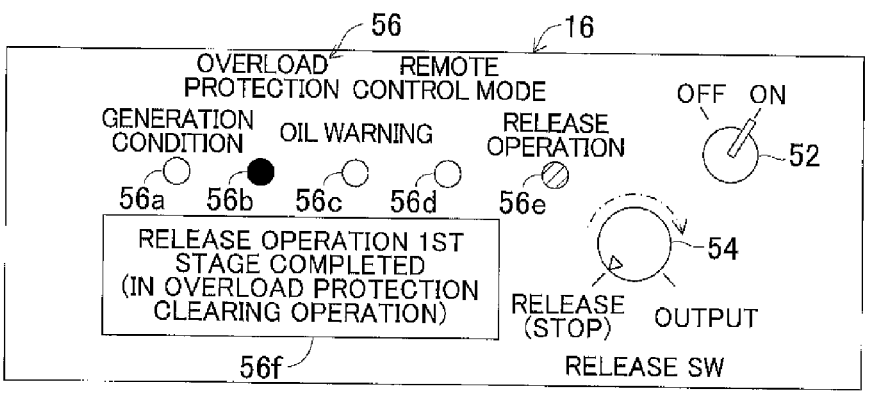

When the result in S20 is affirmative, the program proceeds to S22 in which a fact that the first stage of the release operation has been completed is displayed on the display unit 56. More exactly, as shown in FIG. 3C, the release operation indicating lamp 56e is blinked (blinking is indicated by diagonal lines in the drawing) while an indication saying "release operation 1st stage completed," "in overload protection clearing operation" or the like is displayed on the LCD 56f, for example.

Next the program proceeds to S24 in which it is determined whether a second stage of the release operation is conducted, i.e., whether the output position of the release switch 54 is selected upon manipulation by the operator. To be more specific, it is determined whether the release switch 54 is turned (returned) to the output position located rightward in FIGS. 3A-3D, as indicated by an arrow of dashed and dotted line in FIG. 3C, and is fixed with a click feel.

Figure 3D:
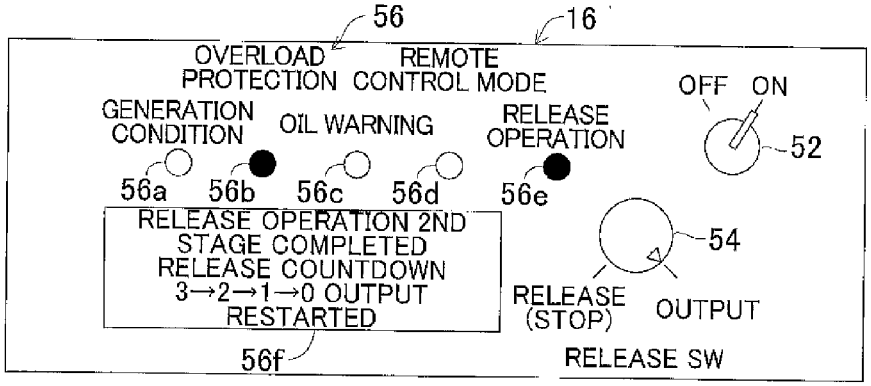

When the result in S24 is negative, the program returns to S22, while when the result is affirmative, the program proceeds to S26 in which a fact that the second stage of the release operation has been completed (i.e., that the release command is outputted from the release switch 54) is displayed on the display unit 56. At the same time, the time it takes until the outputting to the electric load 50 is restarted after the stop condition is released, is counted down (i.e., a countdown is started) and the countdown number is also displayed. In S26, as shown in FIG. 3D, the release operation indicating lamp 56e being blinked is controlled to remain lighted, while an indication saying "release operation 2nd stage completed," the countdown number such as "release countdown 3→2→1→0 output restarted" or the like is displayed on the LCD 56f, for example.

Next the program proceeds to S28 in which it is determined whether a predetermined time period elapses since the release switch 54 is returned to the output position (i.e., since the release command is outputted from the release switch 54 after the release operation is completed), in other words, whether the countdown is finished. The predetermined time period is set to a value that is sufficient for the operator to recognize the restart of the outputting, e.g., 3 seconds.

When the result in S28 is negative, the processing of S28 is repeated, while when the result is affirmative, the program proceeds to S30 in which the stop condition is released and the outputting to the electric load 50 is restarted, more exactly, an output restart signal is sent to the generation control unit 42. Upon receipt of the output restart signal, the generation control unit 42 controls the operations of the inverter 36, etc., to release the stop condition where the outputting from the inverter 36 to the electric load 50 is stopped, thereby restarting the outputting to the electric load 50. Although not illustrated, when the outputting is restarted, the overload protection lamp 56b and release operation indicating lamp 56e are turned off.

Thus, it is configured so that, in response to a plurality of operations of the release switch 54 (special manipulations; more precisely, manipulations to turn the release switch 54 from the output position to the release position and subsequently, turn it back to the output position), the release command is outputted from the release switch 54.

On the other hand, when the result in S18 is affirmative, i.e., when the overload condition is repeatedly detected after the outputting is restarted so that the counter value C reaches the prescribed value Ca, the program proceeds to S32 in which the operation of the engine 12 is stopped and the operator is urged to pay attention, i.e., check the status of use of the electric load 50. The prescribed value Ca is set as a criterion for determining whether the operator should pay attention because the overload condition is detected multiple times, e.g., set to 5 times.

When the result in S20 is negative, the program proceeds to S34 in which it is determined whether a prescribed time period elapses after the outputting is stopped. When the result in S34 is negative, the program returns to S20, while when the result is affirmative, the program proceeds to S32 in which the engine 12 operation is stopped. Specifically, when the release operation is not conducted (i.e., the restart of the outputting is not requested) during the prescribed time period after the outputting is stopped due to the overload condition, the engine 12 operation is stopped. The prescribed time period is set as a criterion for concluding that there is no request for the restart of the outputting, e.g., set to 5 minutes (300 seconds).

As stated above, in the first embodiment, it is configured to stop the outputting from the inverter 36 to the electric load 50 with the engine 12 being kept operating when the overload condition is detected based on the alternating current outputted from the inverter 36 to the electric load 50 (S10, S12); and, when a release command to release the stop condition where the outputting from the inverter 36 to the electric load 50 is stopped is outputted upon manipulation by an operator, release the stop condition, thereby restarting the outputting to the electric load 50 (S20, S24, S30).

With this, when the overload condition is detected, the outputting to the electric load 50 is stopped, thereby enabling to protect the electric load 50 and the like.

Further, since the outputting is stopped with the engine 12 being kept operating, when the outputting is restarted in response to the release command outputted by the operator, it is not necessary to restart the engine 12. With this, it becomes easy to restart the outputting to the electric load 50, thereby mitigating a burden on the operator. Also, since the outputting can be restarted earlier, a period of time of no outputting can be shortened, thereby enhancing convenience.

Further, the release command outputter is constituted of a switch, i.e., the release switch 54, and the release switch 54 is configured to output the release command when a plurality of operations are conducted, i.e., in response to the special manipulations. With this, it becomes possible to effectively urge the operator to pay attention to the restart of the outputting and check the status of use of the electric load 50, etc. Also, since the stop and restart of the outputting, the operation of the display unit 56, and the like are controlled by the engine control unit 44, the system capacity can be made compact while the versatility can be enhanced.

It is configured to restart the outputting to the electric load 50 by releasing the stop condition when the release command is outputted by the release switch 54 and the predetermined time period elapses since the release command is outputted (S28, S30). With this, it becomes possible to inform the operator of, for instance, the time it takes until the outputting is restarted (i.e., predetermined time period), so that the operator can recognize and pay attention to the restart.

It is configured to count the number of times (value C) the overload condition is detected, and stop the operation of the engine 12 when the counted value C reaches the prescribed value Ca (S18, S32). With this, in the case where, for instance, the stop of the outputting due to the overload condition and the restart thereof are repeated, the engine 12 operation is stopped, so that it becomes possible to urge the operator to pay attention and check the status of use of the electric load 50.

It is configured to inform the operator that the overload condition is detected when the overload condition is detected (S14). With this, it becomes possible to effectively make the operator recognize that the overload condition is detected.

It is configured to inform the operator that the release command is outputted when the release command is outputted (S26). With this, it becomes possible to effectively make the operator recognize that the release command is outputted.

Since it is configured so that the release switch 54 includes the volume switch installed to be manually operated by the operator, the structure can be simple.

An inverter generator control apparatus according to a second embodiment of this invention will now be explained.

Figure 5A:
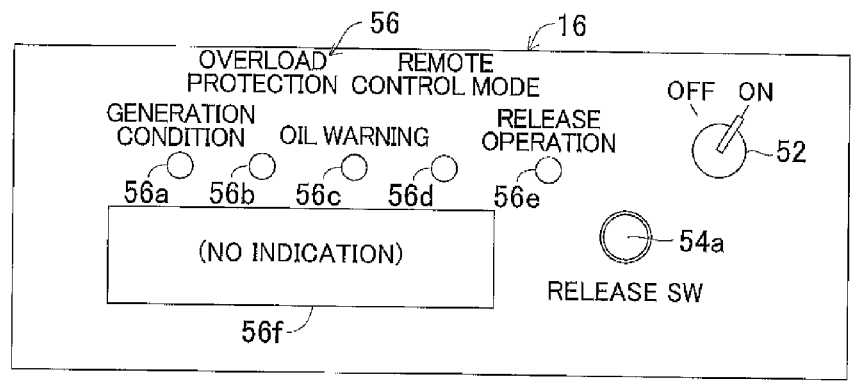
FIGS. 5A-5C are plan views similar to FIG. 4, but showing a control panel of an inverter generator control apparatus according to a second embodiment of the invention.
Figure 5B:
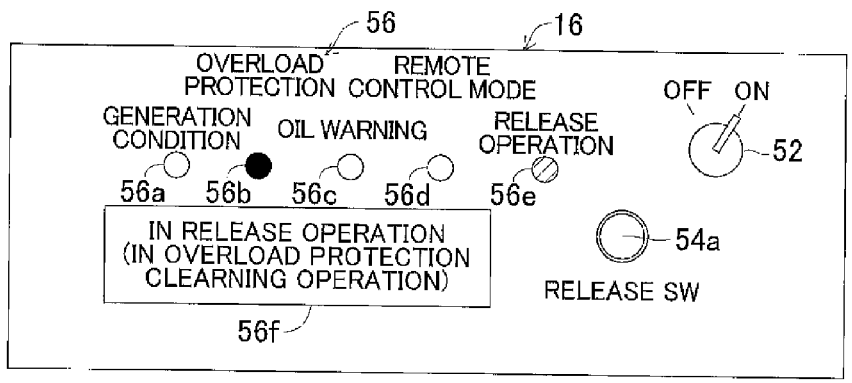
Figure 5C:
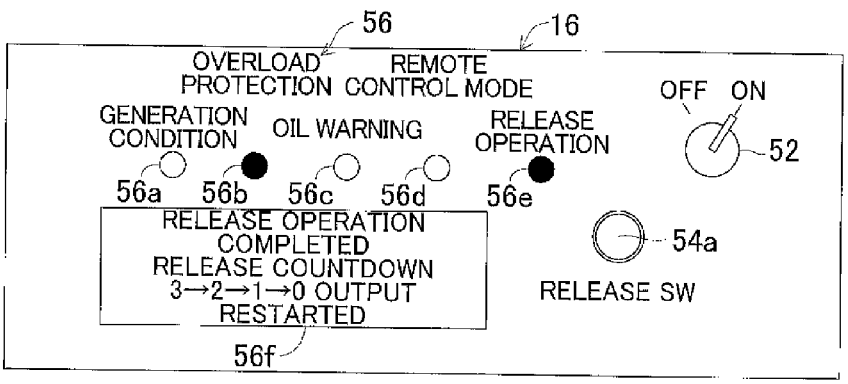

FIGS. 5A-5C are plan views showing the control panel 16 of the inverter generator control apparatus according to the second embodiment.

The explanation of the second embodiment will focus on the points of difference from the first embodiment. In the second embodiment, the release switch 54 is constituted of, in place of the volume switch, a push switch of momentary type that is installed to be manually operated by the operator, as shown in FIGS. 5A-5C. The release switch (assigned by 54a in the second embodiment) outputs to the engine control unit 44 an ON signal when manipulated (pressed) by the operator and an OFF signal when not manipulated.

Figure 6:
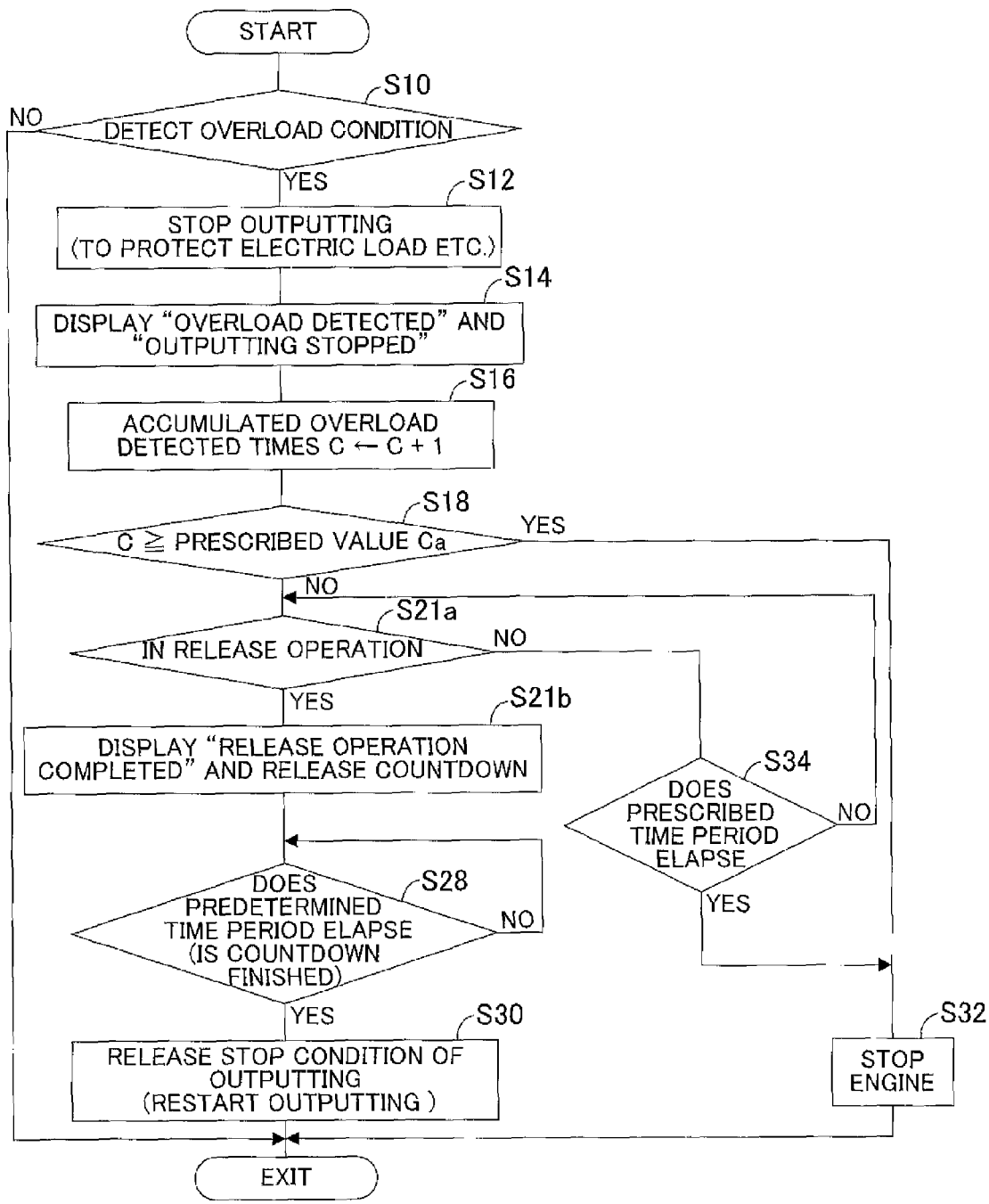
FIG. 6 is a flowchart similar to FIG. 4, but showing the operation of an engine control unit shown in FIG. 1.

FIG. 6 is a flowchart similar to FIG. 4, but showing the operation of the engine control unit 44, i.e., the operation when an overload condition is detected. Note that steps of the same operations as in FIG. 4 are assigned by the same step numbers.

As shown in FIG. 6, the processing of S10 to S18 is conducted similarly to those in the first embodiment. When the result in S18 is negative, the program proceeds to S21a in which it is determined whether the release operation is conducted, i.e., whether the release switch 54 is manipulated to output the release command. Here, in order to prevent an erroneous operation, whether the release operation has been conducted is determined by checking as to whether an intentional operation which is usually not conducted has been carried out with the release switch 54a. For example, when the release switch 54 is kept pressed for three seconds or when it is pressed ten times within five seconds, it is discriminated that the release operation is conducted (i.e., the release command is outputted).

In S21a, during the release operation, as shown in FIG. 5B, the release operation indicating lamp 56e is blinked while an indication saying "in release operation," "in overload protection clearing operation" or the like is displayed on the LCD 56f, for example, so as to inform the operator that the release operation is conducted.

When the result in S21a is negative, the program proceeds to S34 in which the aforementioned processing is conducted. When the result in S21a is affirmative, the program proceeds to S21b in which a fact that the release operation has been completed (i.e., the release command has been outputted) is displayed on the display unit 56, while a countdown is started and the countdown number is also displayed similarly to S26. Specifically, as shown in FIG. 5C, the release operation indicating lamp 56e being blinked is controlled to remain lighted, while an indication saying "release operation completed," the countdown number such as "release countdown 3→2→1→0 output restarted" or the like is displayed on the LCD 56f, for example. Then the program proceeds to S28 in which the aforementioned processing is conducted.

Thus, since the release switch 54a in the second embodiment includes the push switch installed to be manually operated by the operator, the structure can be simple.

The remaining configuration is the same as that in the first embodiment, so that the explanation thereof is omitted.

An inverter generator control apparatus according to a third embodiment of this invention will now be explained.

The third embodiment is an alternative example of the first embodiment. It is configured so that the release switch 54 can be used not only to release the outputting stop condition established in response to detection of the overload condition, but also to temporarily stop or suspend the outputting to the electric load 50 upon manipulation during the normal operation.

Figure 7:
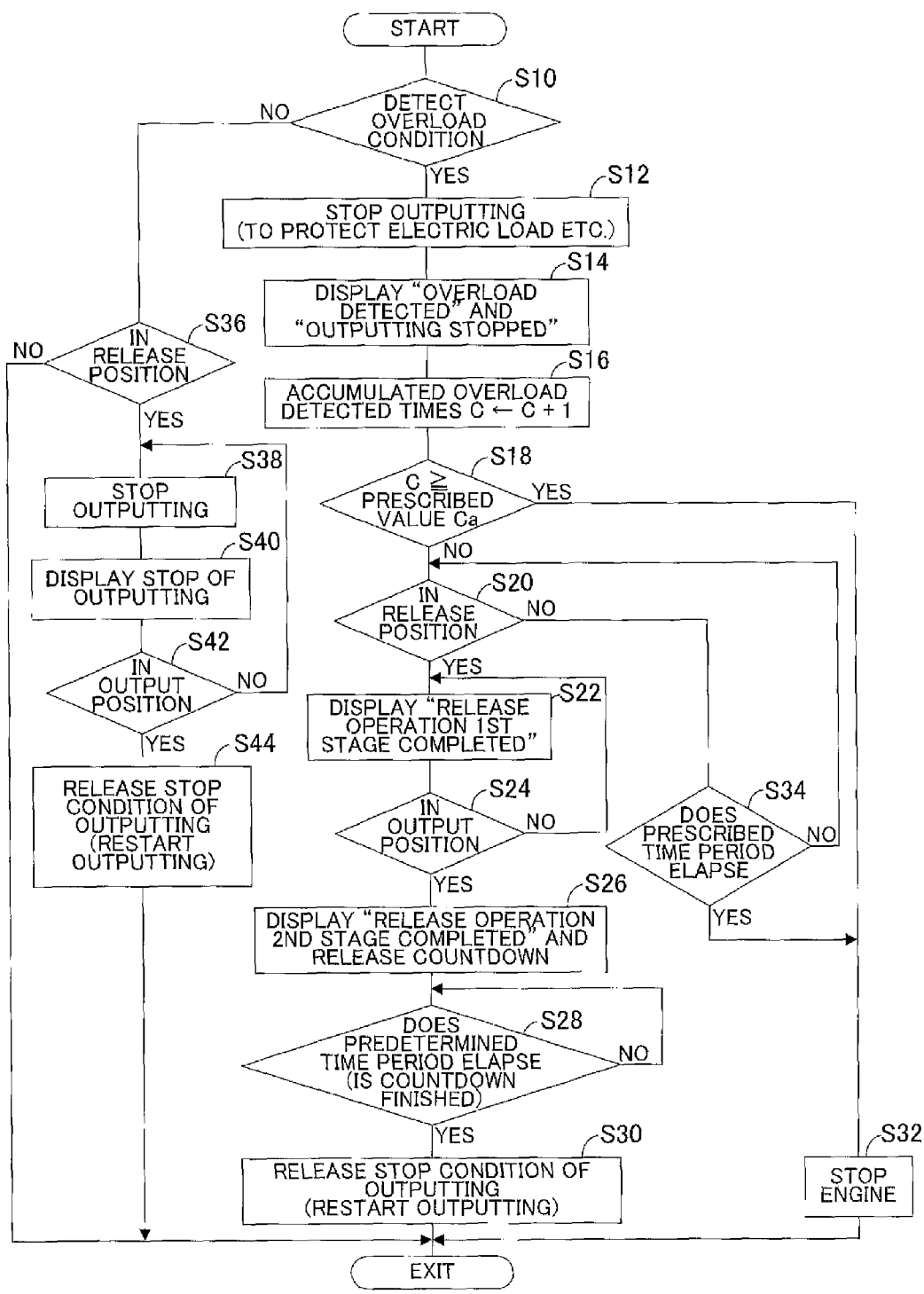
FIG. 7 is a flowchart similar to FIG. 4, but showing the operation of an engine control unit of an inverter generator control apparatus according to a third embodiment of the invention.

FIG. 7 is a flowchart similar to FIG. 4, but showing the operation of the engine control unit 44 of the inverter generator control apparatus according to the third embodiment.

The explanation will be made with focus on the points of difference from the flowchart in the first embodiment. The processing of S10 to S34 is conducted similarly to that in the first embodiment. When the result in S10 is negative, i.e., when the overload condition is not detected and it is determined to be in the normal operation, the program proceeds to S36 in which it is determined whether the release position of the release switch 54 is selected upon manipulation by the operator.

When the result in S36 is negative, the program is terminated, while when the result is affirmative, it is determined (estimated) that the operator request a temporary stop of the outputting to the electric load 50 and the program proceeds to S38. In S38, in order to stop the outputting, the output stop signal is sent to the generation control unit 42. Upon receipt of the output stop signal, the generation control unit 42 controls the operation of the inverter 36 for example, thereby stopping the outputting from the inverter 36 to the electric load 50. At this time, similarly to S12, the engine 12 operation is continued.

Figure 8:
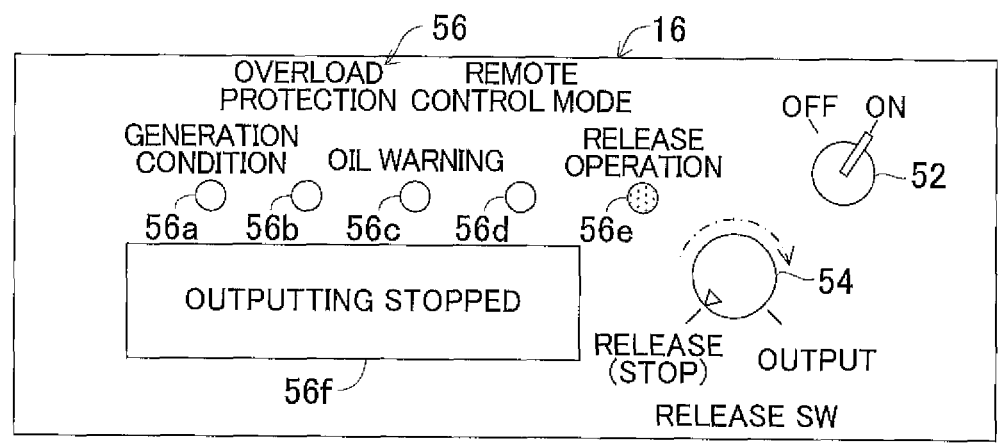
FIG. 8 is a plan view similar to FIGS. 3A-3D, but showing another control panel.

Next the program proceeds to S40 in which a fact that the outputting to the electric load 50 has been stopped is informed to the operator through the display unit 56. Specifically, as shown in FIG. 8, the release operation indicating lamp 56e of the display unit 56 is operated, i.e., blinked in a blinking pattern different from that in S22 in the first embodiment (as indicated with dots in FIG. 8) and an indication saying "outputting stopped" or the like is displayed on the LCD 56*f*.

Next the program proceeds to S42 in which it is determined whether the output position of the release switch 54 is selected upon manipulation by the operator. Specifically, it is determined whether the release switch 54 is turned to the output position as indicated by an arrow of dashed and dotted line in FIG. 8, and is fixed with a click feel.

When the result in S42 is negative, the program returns to S38, while when the result is affirmative, it is determined (estimated) that the operator requests restart of the outputting to the electric load 50 by releasing the temporary stop condition of the outputting, and the program proceeds to S44 in which the stop condition is released to restart the outputting to the electric load 50. Specifically, the output restart signal is sent to the generation control unit 42, and upon receipt of the output restart signal, the generation control unit 42 controls the operations of the inverter 36, etc., to release the stop condition where the outputting from the inverter 36 to the electric load 50 is stopped, thereby restarting the outputting to the electric load 50. At the restart, the release operation indicating lamp 56*e* is turned off.

Thus, as described in the foregoing, the apparatus according to the third embodiment is configured so that the release switch 54 can be used not only to release the outputting stop condition established in response to detection of the overload condition, but also to temporarily stop or suspend the outputting to the electric load 50 upon manipulation during the normal operation. With this, it becomes possible to further enhance convenience of the generator 10.

The remaining configuration is the same as that in the first embodiment, so that the explanation thereof is omitted.

As stated above, the first to third embodiments are configured to have an apparatus and method for controlling an inverter generator (10) having a generator unit (14) driven by an engine (12), a converter (first converter 24, second converter 26) connected to the generator unit and adapted to convert an alternating current outputted from the generator unit to a direct current, and an inverter (36) connected to the converter and adapted to invert the direct current outputted from the converter to an alternating current and output it to an electric load (50), comprising: an overload condition detector (current sensor 60, generation control unit 42, engine control unit 44, S10) adapted to detect an overload condition based on the alternating current outputted from the inverter to the electric load; an output stopper (engine control unit 44, S12) adapted to stop outputting from the inverter to the electric load with the engine being kept operating when the overload condition is detected; a release command outputter (release switch 54, 54*a*) adapted to output a release command to release a stop condition where the outputting to the electric load is stopped upon manipulation by an operator; and an output restarter (engine control unit 44, S20, S24, S30, S21*a*) adapted to restart the outputting to the electric load by releasing the stop condition when the release command is outputted by the release command outputter.

In the apparatus and method, the output restarter restarts the outputting to the electric load by releasing the stop condition when the release command is outputted by the release command outputter and a predetermined time period elapses since the release command is outputted (S20, S24, S28, S30, S21*a*).

The apparatus and method further includes a counter (engine control unit 44, S16) adapted to count number of times (value C) the overload condition is detected by the overload condition detector, and the output stopper stops operation of the engine when the counted number of times reaches a prescribed value (Ca) (S18, S32).

The apparatus and method further includes an overload condition informing unit (display unit 56, engine control unit 44, S14) adapted to inform the operator that the overload condition is detected when the overload condition is detected by the overload condition detector.

The apparatus and method further includes a release command output informing unit (display unit 56, engine control unit 44, S26, S21*b*) adapted to inform the operator that the release command is outputted when the release command is outputted by the release command outputter.

In the first and third embodiments, in the apparatus and method, the release command outputter (release switch 54) includes a volume switch installed to be manually operated by the operator.

In the second embodiment, in the apparatus and method, the release command outputter (release switch 54*a*) includes a push switch installed to be manually operated by the operator.

It should be noted that, although the FETs are used as the switching elements of the second converter 26, etc., in the foregoing, this is not a limitation and Insulated Gate Bipolar Transistors (IGBTs) or the like may be used instead.

It should also be noted that, in the foregoing, although the line-to-line voltage Vb generated at the second winding 22*b* is decreased by decreasing the number of turns of the second winding 22*b*, the number of associated reels of the stator 14*a* can be reduced instead. To be more specific, the numbers of reels of the first winding 22*a* and second winding 22*b* are both fifteen and the number of turns is decreased in the foregoing. Instead of this configuration, the numbers of turns of the first and second windings 22*a*, 22*b* are made the same and the number of reels of the first winding 22*a* is set to twenty-one while that of the second winding 22*b* are set to nine, so that the line-to-line voltage Vb of the second winding 22*b* can be lower than the line-to-line voltage Va of the first winding 22*a*.

It should also be noted that the LCD 56*f* may be another display such as a seven-segment LED. Further, although a fact that the overload condition has been detected, etc., are informed to the operator through the display unit 56 in the foregoing, a buzzer or the like can be used to audibly inform it.

It should also be noted that, although the prescribed value Ca, predetermined time period, line-to-line voltages Va, Vb of the first and second windings 22*a*, 22*b*, the rated output voltage of the inverter generator 10, and other values are indicated with specific values in the foregoing, they are only examples and not limited thereto.

It should further be noted that, in the second embodiment, instead of installment of one release switch 54*a*, a plurality of the release switches 54*a* may be installed to configure so that, when they are manipulated concurrently, the release command is outputted.

Japanese Patent Application No. 2011-110567, filed on May 17, 2011, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling an inverter generator having a generator unit driven by an engine, a converter connected to the generator unit and adapted to convert an alternating current outputted from the generator unit to a direct current, and an inverter connected to the converter and adapted to invert the direct current outputted from the converter to an alternating current and output it to an electric load, comprising:
- an overload condition detector adapted to detect an overload condition based on the alternating current outputted from the inverter to the electric load;
- an output stopper adapted to stop outputting from the inverter to the electric load with the engine being kept operating when the overload condition is detected;
- a release command outputter adapted to output a release command to release a stop condition where the outputting to the electric load is stopped upon manipulation by an operator; and
- an output restarter adapted to restart the outputting to the electric load by releasing the stop condition when the release command is outputted by the release command outputter.

2. The apparatus according to claim 1, wherein the output restarter restarts the outputting to the electric load by releasing the stop condition when the release command is outputted by the release command outputter and a predetermined time period elapses since the release command is outputted.

3. The apparatus according to claim 1, further including:
- a counter adapted to count number of times the overload condition is detected by the overload condition detector, and the output stopper stops operation of the engine when the counted number of times reaches a prescribed value.

4. The apparatus according to claim 1, further including:
- an overload condition informing unit adapted to inform the operator that the overload condition is detected when the overload condition is detected by the overload condition detector.

5. The apparatus according to claim 1, further including:
- a release command output informing unit adapted to inform the operator that the release command is outputted when the release command is outputted by the release command outputter.

6. The apparatus according to claim 1, wherein the release command outputter includes a volume switch installed to be manually operated by the operator.

7. The apparatus according to claim 1, wherein the release command outputter includes a push switch installed to be manually operated by the operator.

8. An apparatus for controlling an inverter generator having a generator unit driven by an engine, a converter connected to the generator unit and adapted to convert an alternating current outputted from the generator unit to a direct current, and an inverter connected to the converter and adapted to invert the direct current outputted from the converter to an alternating current and output it to an electric load, comprising:
- overload condition detecting means for detecting an overload condition based on the alternating current outputted from the inverter to the electric load;
- output stopping means for stopping outputting from the inverter to the electric load with the engine being kept operating when the overload condition is detected;
- release command outputting means for outputting a release command to release a stop condition where the outputting to the electric load is stopped upon manipulation by an operator; and
- output restarting means for restarting the outputting to the electric load by releasing the stop condition when the release command is outputted by the release command outputting means.

9. The apparatus according to claim 8, wherein the output restarting means restarts the outputting to the electric load by releasing the stop condition when the release command is outputted by the release command outputting means and a predetermined time period elapses since the release command is outputted.

10. The apparatus according to claim 8, further including:
- counting means for counting number of times the overload condition is detected by the overload condition detecting means, and the output stopping means stops operation of the engine when the counted number of times reaches a prescribed value.

11. The apparatus according to claim 8, further including:
- overload condition informing means for informing the operator that the overload condition is detected when the overload condition is detected by the overload condition detecting means.

12. The apparatus according to claim 8, further including:
- release command output informing means for informing the operator that the release command is outputted when the release command is outputted by the release command outputting means.

13. The apparatus according to claim 8, wherein the release command outputting means includes a volume switch installed to be manually operated by the operator.

14. The apparatus according to claim 8, wherein the release command outputting means includes a push switch installed to be manually operated by the operator.

15. A method for controlling an inverter generator having a generator unit driven by an engine, a converter connected to the generator unit and adapted to convert an alternating current outputted from the generator unit to a direct current, and an inverter connected to the converter and adapted to invert the direct current outputted from the converter to an alternating current and output it to an electric load, comprising the steps of:
- detecting an overload condition based on the alternating current outputted from the inverter to the electric load;
- stopping outputting from the inverter to the electric load with the engine being kept operating when the overload condition is detected;
- outputting a release command to release a stop condition where the outputting to the electric load is stopped upon manipulation by an operator; and
- restarting the outputting to the electric load by releasing the stop condition when the release command is outputted.

16. The method according to claim 15, wherein the step of restarting restarts the outputting to the electric load by releasing the stop condition when the release command is outputted and a predetermined time period elapses since the release command is outputted.

17. The method according to claim 15, further including the step of:
- counting number of times the overload condition is detected, and the step of stopping stops operation of the engine when the counted number of times reaches a prescribed value.

18. The method according to claim 15, further including the step of:
- informing the operator that the overload condition is detected when the overload condition is detected.

19. The method according to claim 15, further including the step of:
- informing the operator that the release command is outputted when the release command is outputted.

20. The method according to claim 15, wherein the step of outputting is made using a volume switch installed to be manually operated by the operator.

21. The method according to claim 15, wherein the step of outputting is made using a push switch installed to be manually operated by the operator.

* * * * *